(12) United States Patent
Tahira

(10) Patent No.: US 6,850,807 B2
(45) Date of Patent: Feb. 1, 2005

(54) TRIPLE REDUNDANT CONTROL DEVICE AND METHOD

(75) Inventor: Masayoshi Tahira, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 322 days.

(21) Appl. No.: 10/237,969

(22) Filed: Sep. 10, 2002

(65) Prior Publication Data

US 2003/0069649 A1 Apr. 10, 2003

(30) Foreign Application Priority Data

Sep. 10, 2001 (JP) ........................................ 2001-273240

(51) Int. Cl.$^7$ ................................................ G05B 9/02
(52) U.S. Cl. .............................. 700/79; 700/3; 700/19; 700/20; 700/21; 700/22; 714/11
(58) Field of Search .............................. 700/19–22, 79, 700/3; 714/11

(56) References Cited

U.S. PATENT DOCUMENTS

| | | | | |
|---|---|---|---|---|
| 4,593,249 A | * | 6/1986 | Arita et al. | 327/62 |
| 4,626,707 A | * | 12/1986 | Arita et al. | 327/66 |
| 6,061,809 A | * | 5/2000 | Glaser et al. | 714/11 |
| 6,711,513 B2 | * | 3/2004 | Brown et al. | 702/79 |

FOREIGN PATENT DOCUMENTS

| JP | 4-287201 | 10/1992 |
|---|---|---|
| JP | 6-75603 | 3/1994 |

* cited by examiner

*Primary Examiner*—Anthony Knight
*Assistant Examiner*—Ronald D Hartman, Jr.
(74) *Attorney, Agent, or Firm*—Foley & Lardner LLP

(57) ABSTRACT

A triple redundant control device, including, first to third control units, each outputting corresponding one of first to third control signals, and outputting corresponding one of first to third control stop signals when corresponding one of the first to third control units stops, first to third higher value selector switches, each receiving corresponding one of the first to third control signals and corresponding one of the first to third control stop signals, outputting corresponding one of the first to third control signals, and changing output into a signal associated to a value being higher than values of the first to third control signals when the corresponding one of first to third operation stop signal is inputted, a medium value gate receiving signals outputted from the first to third higher value selector switches, selecting and outputting a medium value of values corresponding to the first to third control signals, and a signal selector receiving the first to third control signals and a signal outputted from the medium value gate, outputting the signal outputted from the medium value gate, and changing output, when two of the first to third control signals are inputted, into one control signal corresponding to one operation signal not being inputted.

22 Claims, 12 Drawing Sheets

TRIPLE REDUNDANT CONTROL DEVICE AND METHOD

CROSS-REFERENCE TO RELATED APPLICATIONS

This application is based upon and claims the benefit of priority from the prior Japanese Patent Application No. 2001-273240 filed on Sep. 10, 2001, the entire contents of which are incorporated herein by reference.

BACKGROUND OF THE INVENTION

1. Field of the Invention

This invention relates to a triple redundant control device and triple redundant control method which can be used in a power generation plant, for example.

2. Description of the Related Art

A known triple redundant control device, which includes three control units, is constructed so as to select a medium value (i.e. median) of three signals each of which is outputted from one respective control unit, and to output a control signal corresponding to the medium value. This is also called a triple redundant medium value selection system. A structure of a conventional triple redundant control device which adopts this triple redundant medium value selection system, which can be used for a power generation plant, for example, is shown in FIG. 14, whereby a control method corresponding to the control device will also be explained.

In FIG. 14, the conventional control device has three system control units 1, 2, 3 which composes a triple redundant system, that is, System A, System B and System C, and a medium value gate (MVG) 4 which chooses and outputs a median among three values each corresponding to an output from the respective control unit. Here, the middle signal level is selected from the three outputs of triple control units, and is outputted as a control command signal b. Moreover, when the control units 1, 2, 3 detect a failure by self-diagnostics, the control unit output failure signals a1, a2, a3, respectively. There is a two out of three selector circuit 5 which outputs a shut-down command signal g, such as a turbine trip command, provided at least two of the three systems output the failure signal. When the shut-down command g is outputted, operations of controlled equipment such as a turbo-generator is suspended.

Thus, in this conventional triple redundant control device, when one control unit fails and an output from the failed control unit drops below a normal output level range, that is, downscale has occurred, the medium value gate 4 selects and outputs the lower in signal level of the two signals from the two normally operating control units. Thus, as a result, the lower of the two signals outputted from the two normally operating control units is used as the control command b, and the control continues normally. Conversely, when one control unit fails and an output from the failed control unit increases above a normal output level range, that is, upscale has occurred, the medium value gate 4 selects and outputs the higher in signal level of the two signals from the two normally operating control units. Thus, the control continues normally.

When double failure of control units occurs, for example, when outputs of two control units are downscaled, the medium value gate 4 selects one of the downscaled signals, and normal control cannot be maintained. Thus, in this case when two failure signals of two control units are outputted, the two out of three selector circuit 5 outputs operation suspend command g to controlled equipment.

In the above-mentioned conventional triple redundant control device and method, when one control unit is separated and inspected, or when one control unit is in failure, one of the outputs from the other two control units is selected and the control is continued according to the selected one output. However, if one of the other control units is also inspected or in failure, the control of equipment is stopped even though one of the three control units is in a normal state, and thereby utilization rates of controlled objects decreases.

SUMMARY OF THE INVENTION

Accordingly, to eliminate this problem, at least one embodiment of this invention relates triple redundant control device and method that is to able to continue control when one control unit is in inspection or in failure by relying on the other two normally operating control units, and further to provide control when an additional one of the two normally operating control units becomes in inspection or in failure, and thereby the utilization rate of controlled objects can be increased.

Other and further aspects of this invention will become apparent upon an understanding of the illustrative embodiments to be described herein or will be indicated in the appended claims while various advantages not referred to herein will be appeared to one skilled in the art upon employment of the invention in practice.

According to an aspect of the present invention, there is provided a triple redundant control device, including, first to third control units, each of which outputs a corresponding one of first to third control signals, and outputs a corresponding one of first to third control stop signals when the corresponding one of the first to third control units stops, first to third higher value selector switches, each configured to receive the corresponding one of the first to third control signals and the corresponding one of the first to third control stop signals, which outputs the corresponding one of the first to third control signals, and changes output into a signal associated to a value higher than values of the first to third control signals when the corresponding one of first to third control stop signals is inputted, a medium value gate configured to receive signals outputted from the first to third higher value selector switches, which selects and outputs a medium value of values corresponding to the first to third control signals, and a signal selector configured to receive the first to third control stop signals and a signal outputted from the medium value gate, which outputs the signal outputted from the medium value gate, and changes output, when two of the first to third control stop signals are inputted, into one control signal corresponding to one control stop signal not being inputted.

According to another aspect of the present invention, there is provided a triple redundant control device, including, first to third control units, each of which outputs a corresponding one of first to third control signals, and outputs a corresponding one of first to third control stop signals when the corresponding one of the first to third control units stops, first to third lower value selector switches, each configured to receive the corresponding one of the first to third control signals and the corresponding one of the first to third control stop signals, which outputs the corresponding one of the first to third control signals, and changes output into a signal associated to a value lower than values of the first to third control signals when the corresponding one of first to third control stop signals is inputted, a medium value gate configured to receive signals outputted from the first to third lower value selector switches, which selects and outputs a medium value of values corresponding to the first to third control signals, and a signal selector configured to receive the first to third control stop signals and a signal outputted from the medium value gate, which outputs the signal outputted from the medium value gate, and changes output, when two of the first to third control stop signals are inputted, into one control signal corresponding to one control stop signal not being inputted.

According to still another aspect of the present invention, there is provided a triple redundant control device, including, first to third control units, each of which outputs a corresponding one of first to third control signals, and outputs a corresponding one of first to third control stop signals when the corresponding one of the first to third control units stops, first to third judgment units, each configured to receive the first to third control stop signals, which outputs a first command to output a signal associated to a value either higher or lower than values of the first to third control signals when the corresponding one of the first to third control signals is inputted and other control stop signals are not inputted, and outputs a second command to output a signal associated to a value either lower or higher, opposite to the first command, than values of the first to third control signals when the corresponding one of the first to third control stop signals is inputted and one of other control stop signals is inputted, first to third higher/lower value selector switches, each configured to receive the corresponding one of the first to third control signals and a command outputted from the corresponding one of the first to third judgment units, which outputs a signal in accordance with the command when the command is inputted from the corresponding one of the first to third judgment units, and outputs a corresponding one of the first to third control signals when the command is not inputted, a medium value gate configured to receive signals outputted from the first to third higher/lower value selector switches, which selects and outputs a medium value of values corresponding to the first to third control signals, and an operation suspend command generator configured to receive the first to third signals and a signal outputted from the signal selector, and outputs an operation suspend command to controlled objects of equipment.

According to still another aspect of the present invention, there is provided a triple redundant control device, including, first to third sensors, each of which outputs a corresponding one of first to third sensor signals, first to third sensor abnormality detectors, each of which detects state of the corresponding one of the first to third sensor signals, and outputs a corresponding one of first to third sensor abnormality signals when abnormality of the corresponding one of the first to third sensor signals is detected, first to third higher value selector switches, each configured to receive corresponding one of the first to third sensor signals and the corresponding one of the first to third sensor abnormality signals, which outputs the corresponding one of the first to third sensor signals, and changes output into a signal associated to a value higher than values of the first to third sensor signals when the corresponding one of first to third sensor abnormality signals is inputted, a medium value gate configured to receive signals outputted from the first to third higher value selector switches, which selects and outputs a medium value of values corresponding to the first to third sensor signals, a signal selector configured to receive the first to third sensor signals and a signal outputted from the medium value gate, which outputs the signal outputted from the medium value gate, and changes output, when two of the first to third sensor abnormality signals are inputted, into one sensor signal corresponding to one sensor abnormality signal not being inputted, and an operation suspend command generator configured to receive the first to third sensor abnormality signals and a signal outputted from the signal selector, and outputs an operation suspend command to controlled objects of equipment when all of the first to third signals are inputted.

According to still another aspect of the present invention, there is provided a triple redundant control device, including, first to third sensors, each of which outputs a corresponding one of first to third sensor signals, first to third sensor abnormality detectors, each of which detects state of the corresponding one of the first to third sensor signals, and outputs a corresponding one of first to third sensor abnormality signals when abnormality of the corresponding one of the first to third sensor signals is detected, first to third lower value selector switches, each configured to receive the corresponding one of the first to third sensor signals and the corresponding one of the first to third sensor abnormality signals, which outputs the corresponding one of the first to third sensor signals, and changes output into a signal associated to a value lower than values of the first to third sensor signals when the corresponding one of first to third sensor abnormality signals is inputted, a medium value gate configured to receive signals outputted from the first to third lower value selector switches, which selects and outputs a medium value of values corresponding to the first to third sensor signals, a signal selector configured to receive the first to third sensor signals and a signal outputted from the medium value gate, which outputs the signal outputted from the medium value gate, and changes output, when two of the first to third sensor abnormality signals are inputted, into one sensor signal corresponding to one sensor abnormality signal not being inputted, and an operation suspend command generator configured to receive the first to third sensor abnormality signals and a signal outputted from the signal selector, and outputs an operation suspend command to controlled objects of equipment when all of the first to third signals are inputted.

According to still another aspect of the present invention, there is provided a triple redundant control device, including, first to third sensors, each of which outputs a corresponding one of first to third sensor signals, first to third sensor abnormality detectors, each of which detects state of the corresponding one of the first to third sensor signals, and outputs a corresponding one of first to third sensor abnormality signals when abnormality of the corresponding one of the first to third sensor signals is detected, first to third judgment units, each configured to receive the first to third sensor abnormality signals, which outputs a first command to output a signal associated to a value either higher or lower than values of the first to third sensor signals when the corresponding one of the first to third sensor abnormality signals is inputted and other sensor abnormality signals are not inputted, and outputs a second command to output a signal associated to a value being either lower or higher, opposite to the first command, than values of the first to third sensor signals when the corresponding one of the first to third sensor abnormality signals is inputted and one of other sensor abnormality signals is inputted, first to third higher/lower value selector switches, each configured to receive the corresponding one of the first to third sensor signals and a command outputted from the corresponding one of the first to third judgment units, which outputs a signal in accordance with the command when the command is inputted from the corresponding one of the first to third judgment units, and outputs the corresponding one of a first to third sensor signals when the command is not inputted, a medium value gate configured to receive signals outputted from the first to third higher/lower value selector switches, which selects and outputs a medium value of values corresponding to the first to third control signals; and an operation suspend command generator configured to receive the first to third signals and a signal outputted from the signal selector, and outputs an operation suspend command to controlled objects of equipment.

According to still another aspect of the present invention, there is provided a method of controlling objects, including, generating first to third control signals by first to third control units, respectively, composing triple redundant control system, switching each of the first to third control signals into a signal having one of a higher value and a lower value, than values of the first to third control signals, in accordance with the corresponding one of the first to third control units being stopped, selecting a signal having a medium value of values corresponding to the first to third control signals, from the first to third control signals, and outputting the selected signal to control objects of equipment provided at least one of the first to third control units is in operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE INVENTION

Figure 1:
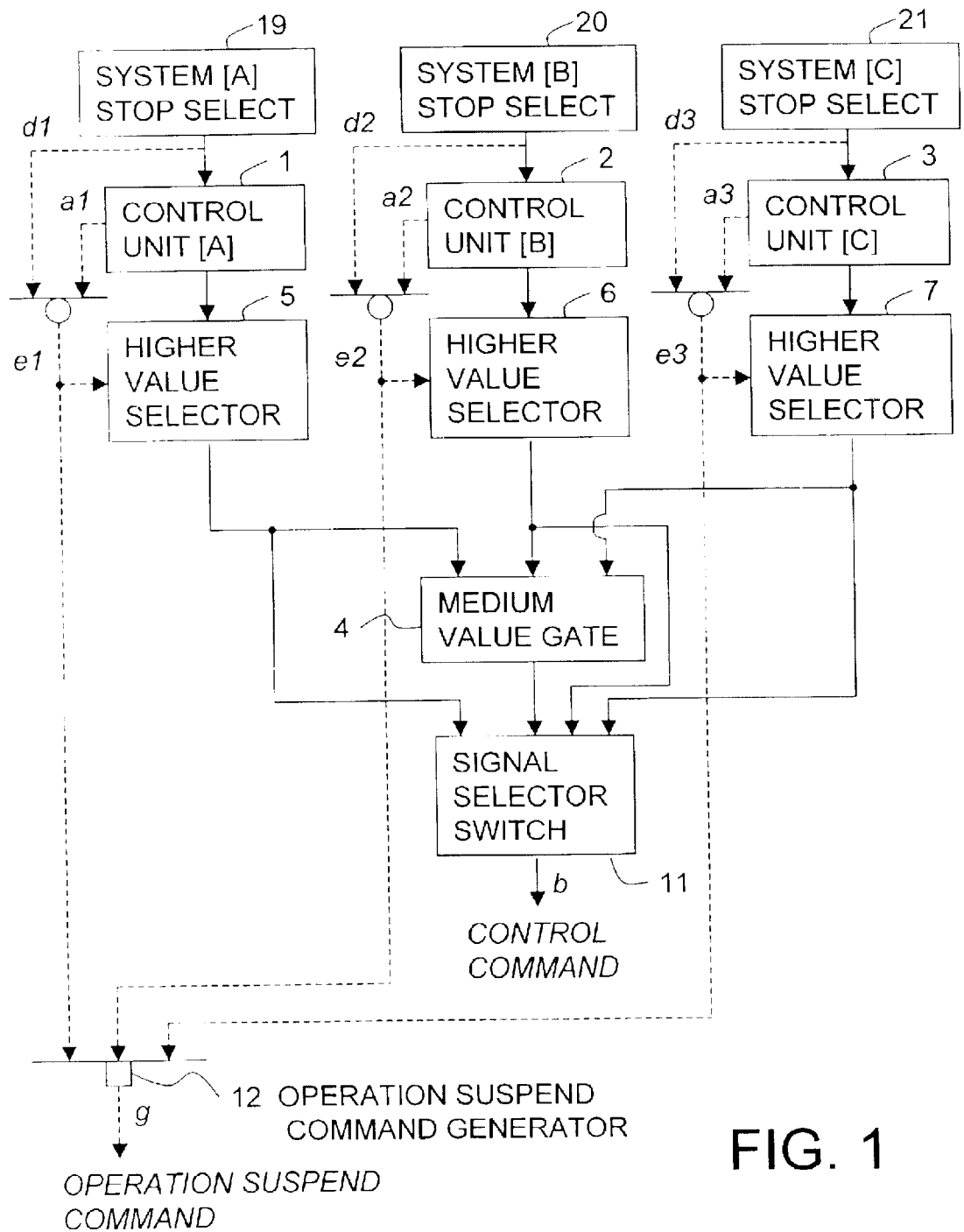
FIG. 1 is a block diagram of triple redundant control device according to a first embodiment of this invention.

Referring now to the drawings, wherein like reference numerals designate identical or corresponding parts throughout the several views, the embodiments of this invention will be described below.

First Embodiment

FIG. 1 is a block diagram showing a first embodiment of this invention. In FIG. 1, control units 1, 2, 3 respectively provided for System A, System B and System C, are formed into a triple redundant system, and a medium value gate (medium value selector switch) outputs a medium value (i.e. median) of signal values outputted from the control units 1, 2, 3, respectively, as a control command b. High value switches 5, 6, 7 are arranged between outputs from the control units 1, 2, 3 and the medium value gate 4, respectively. Stop selector switches 19, 20, 21 are arranged in the respective control units 1, 2, 3. When a stop command d1 (d2, d3) outputted from the stop selector switch 19 (20, 21), by manual control, is in effect, or when a failure signal a1 (a2, a3) is output by self-diagnostics of the control unit 1 (2, 3), a stop signal e1 (e2, e3) is output. Namely, a stop signal e1 (e2, e3) is expressed as an output of OR logic (e.g., OR gate) into which the shut-down command d1 (d2, d3) and the failure signal a1 (a2, a3) are inputted.

When a stop signal e1 is in effect, the high value selector switch 5 with System A being stopped or in failure made changes an output of the control unit 1 into a signal in a higher value side, and the control continues based on high value selection among the remaining two systems, System B and System C. That is, when the output of the control unit 1 changes into a higher value, the medium value gate 4 selects the higher value of values corresponding to output signals from the control units 2, 3, respectively, which is provided as a medium value among three signals.

In addition, the change into a higher value side is made to change a signal into a signal which is the maximum of three outputted signals, that is, for example, it is sufficient that the arranged higher value level is set to a value more than an upper limit of a normal output signal range.

Similarly, when a stop signal e2 (e3) is output, the high value selector switch 6 (7) changes the output from the control unit 2 (3) into a higher value side, and thus the medium value gate 4 selects and outputs a higher value of two outputs from the remaining two control units 1, 3 (1, 2).

When each control unit is operated normally, or when a stop signal from one control unit is inputted into a signal selector switch 11, the signal selector switch 11 selects the output from the medium value gate 4 and outputs it as a control command b, and thus the control is continued. In addition to control signals from respective control units, a stop signal e1, e2, e3 from each control unit is inputted to the signal selector switch 11. When one of the control units is stopped or when a failure occurs in one system, the signal selector switch 11 receives a stop signal corresponding to one system being stopped or in failure, and thus the signal selector switch 11 provides outputs responsive to status of control units 1, 2, 3.

Then, when two stop signals from two systems of control units are inputted to the signal selector switch 11, the signal selector switch 11 detects status that two control units are stopping, then selects a signal outputted from the remaining one control unit which is not stopped or in failure, and outputs the signal as a control command b, and thereby the control is continued. Furthermore, when the stop signals e1, e2, e3 of all three systems are in effect altogether, operation suspend command generator 12 outputs operation suspend command g to controlled objects of equipment.

Figure 2:
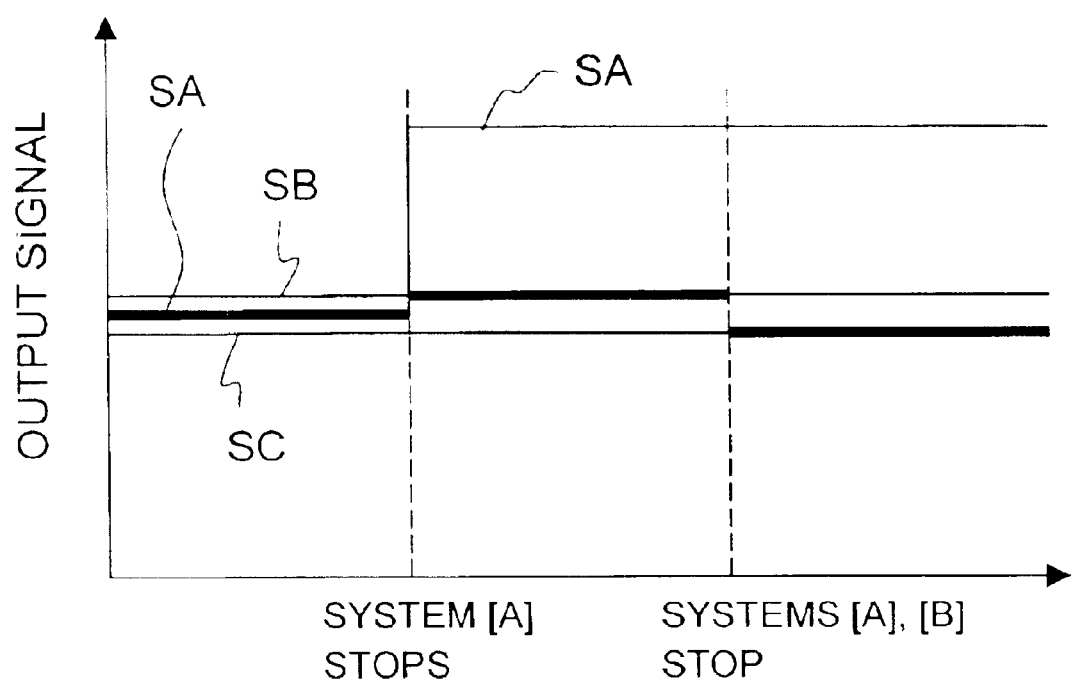
FIG. 2 is a flowchart showing an example of change signals used with the triple redundant control device shown in FIG. 1.

As an example of this embodiment, a correlation of signals outputted from three systems of control units and a command signal outputted from the signal selector 11 is explained with reference to FIG. 2. In FIG. 2, SA, SB, and SC designate outputs of the control units of System A, System B and System C, respectively, and suppose that a relation SC<SB<SA is in effect initially. Also, a bold line in FIG. 2 designates a control signal outputted from the signal selector 11 and inputted into the controlled equipment.

In an initial stage where all systems are in operation, SA, which is a medium value of three signals, is chosen by the medium value gate 4. However, if the control unit of system A stops, the signal SA is changed to a higher value side, and thus the medium value gate 4 chooses SB, which is the higher of two remaining signals SB and SC, instead of SA. Furthermore, if the control unit of system B also stops, two stop signals e1 and e2 are inputted into the signal selector 11, and thus the signal selector 11 outputs a signal SC of system C instead. In this way, as a control signal, the signal selector 11 always selects a signal outputted from one system in operation.

According to this embodiment, when one of the control units is stopped for inspection or when one of the control units fails, an output from this control unit is changed into a higher value side and the control is continued based on higher value selection of signals from the other two control units. Furthermore, if one another control unit is stopped or fails, the signal selector 11 selects a signal outputted from the remaining one control unit in operation, thereby the control is continued. Furthermore, if all three control units are stopped, an operation suspend command g is outputted into controlled objects of equipment for the first time. In this way, the control of controlled equipment is maintained under a condition that at least one of the control units are in operation, and thereby, operating rates of the controlled equipment can be increased.

Second Embodiment

Figure 3:
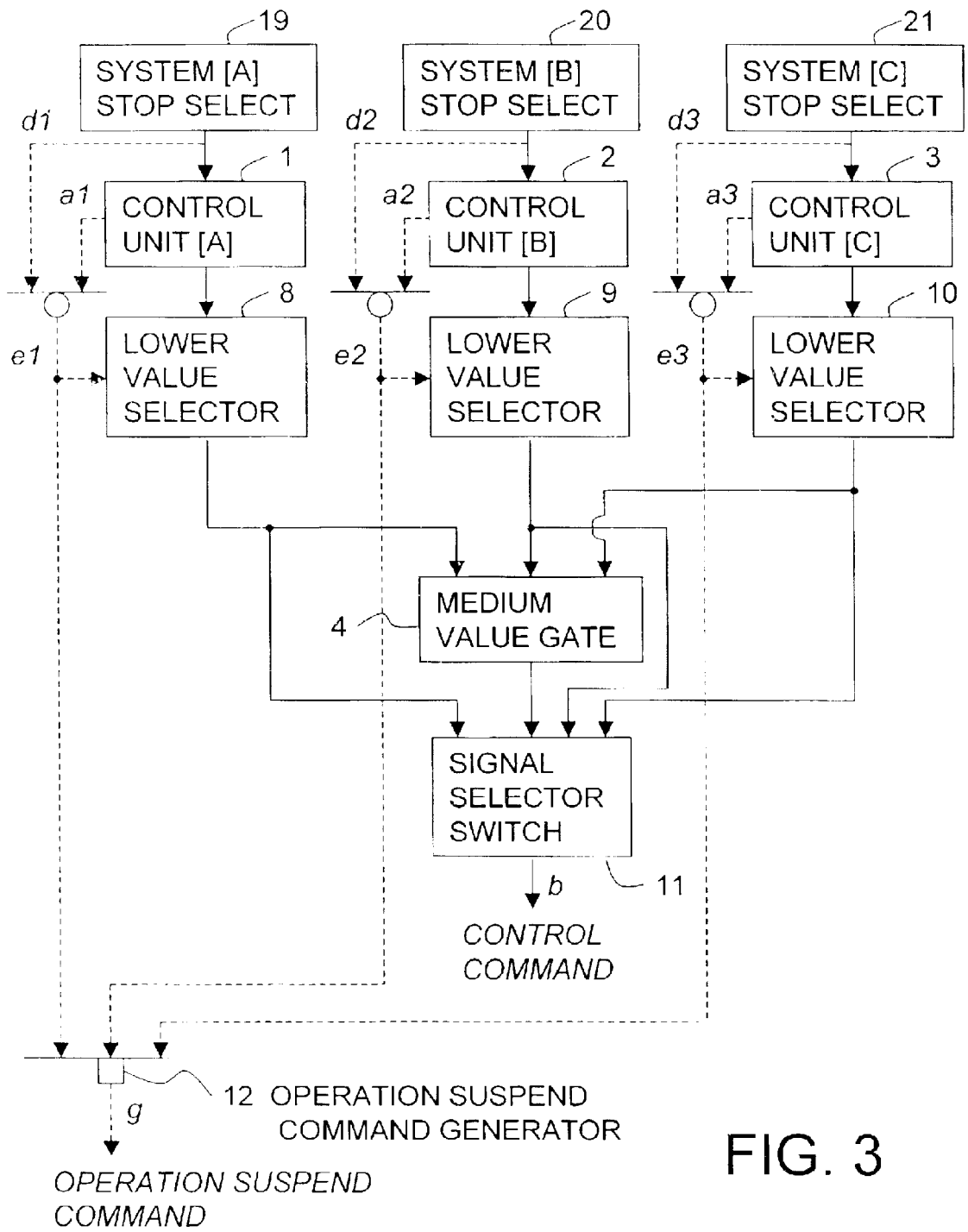
FIG. 3 is a block diagram of triple redundant control device according to a second embodiment of this invention.

FIG. 3 is a block diagram showing a second embodiment of this invention. Herein, the same reference numerals are given to the same components as the first embodiment shown in FIG. 1, and their detailed explanation is omitted. In FIG. 3, the control units 1, 2, 3 that are formed into tripled systems are constituted so that the medium value of the outputs of the three systems may be outputted as a control command b by the medium value gate (medium value selector switch) 4. Lower value selector switches 8, 9, 10 are arranged between outputs of the control units 1, 2, 3 and the medium value gate 4, respectively. When a stop command d1 (d2, d3) is outputted from the stop selector switch 19 (20, 21) arranged onto the control unit 1 (2, 3), by manual control, is in effect, or when a failure signal e1 (e2, e3) is outputted by self-diagnostics of the control unit 1 (2, 3), a stop signal e1 (e2, e3) is in effect.

When a stop signal e1 is in effect, the low value selector switch 8 with System A being stopped or in failure changes an output of the control unit 1 into a signal having a value lower than a normal operational signal range, and the control continues based on high value selection among the remaining two systems, System B and System C. That is, when the output of the control unit 1 changes into a lower value, the medium value gate 4 selects the lower value of values corresponding to output signals from the control units 2, 3, respectively, which is output as a medium value among three signals.

In addition, the change into a lower value side is to change a signal into a signal which is the minimum of three outputted signals, that is, for example, it is enough that the arranged higher value level is set less than a lower limit of an output signal range.

Similarly, when a stop signal e2 (e3) is in effect, the low value selector switch 9 (10) changes the output from the control unit 2 (3) into a lower value side, and thus the medium value gate 4 selects and output a higher value of two outputs from the remaining two control units 1, 3 (1, 2).

When each control unit is operated normally, or when a stop signal from one control unit is inputted into a signal selector switch 11, the signal selector switch 11 selects the output from the medium value gate 4 and outputs it as a control command b, and thus the control is continued.

Then, when two stop signals from two systems of the control units are inputted into the signal selector switch 11, the signal selector switch 11 detects status that two control units have stopped, and selects a signal outputted from the remaining one control unit which is not stopped and in failure, and outputs the signal from that one control unit as a control command b, thereby the control is continued. Furthermore, when the stop signals e1, e2, e3 of all three systems are in effect altogether, operation suspend command generator 12 outputs operation suspend command g to controlled objects of equipment.

Figure 4:
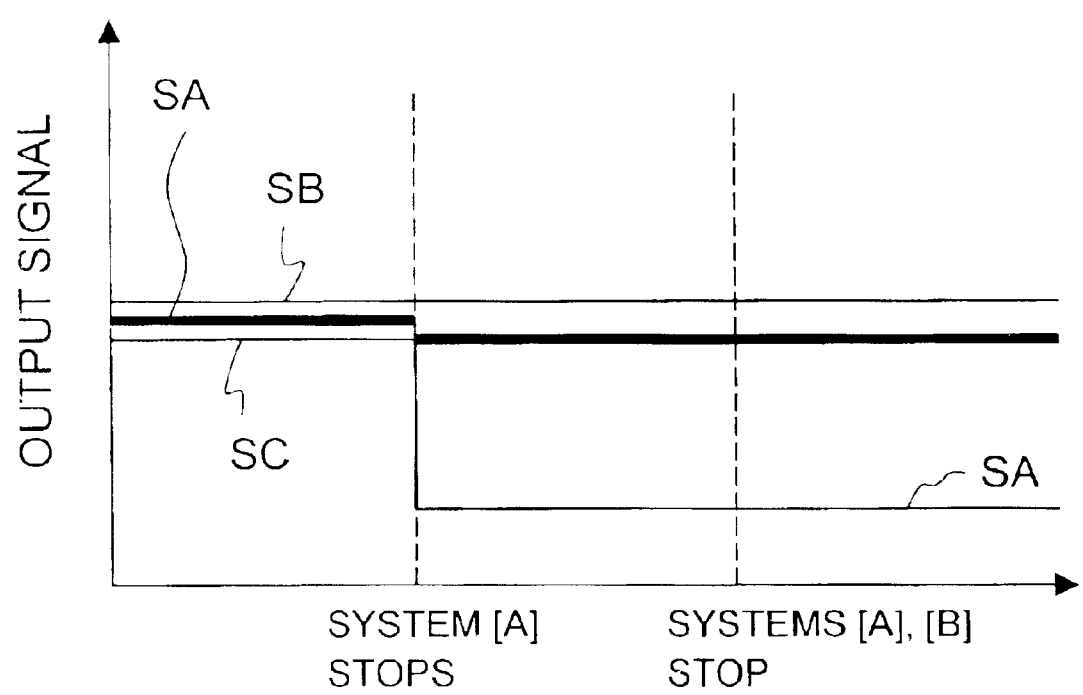
FIG. 4 is a flowchart showing an example of change signals used with the triple redundant control device shown in FIG. 3.

As an example of this embodiment, a correlation of signals outputted from three systems of control units and a command signal outputted from the signal selector 11 is explained with reference to FIG. 4. In FIG. 4, SA, SB, SC and a bold line designate the same as in FIG. 2 discussed previously.

In an initial stage where all systems are in operation, SA, which is a medium value of three signals is chosen with the medium value gate 4. However, if one control unit of System A stops, the signal SA is changed to a lower value side, and thus the medium value gate 4 changes to choose SC, which is the lower of the two remaining signals SB and SC, instead of SA. Furthermore, if the control unit of System B also stops, two stop signals e1 and e2 are inputted into the signal selector 11, and thus the signal selector 11 outputs a signal SC of System C instead. In this way, as a control signal, the signal selector 11 always selects a signal outputted from one system in operation.

According to this embodiment, when one of the control units is stopped for inspection or when one of control units fails, an output from this control unit is changed into a lower value side and the control is continued based on lower value selection of signals from the other two control units. Furthermore, if one other control unit is stopped or fails, the signal selector 11 selects a signal outputted from the remaining one control unit in operation, thereby the control is continued. Furthermore, if all three control units are stopped, an operation suspend command g is outputted into controlled objects of equipment for the first time. In this way, the control of controlled equipment is maintained under a condition that at least one of the control units are in operation, and thereby, operating rates of the controlled equipment can be increased.

Third Embodiment

Figure 5:
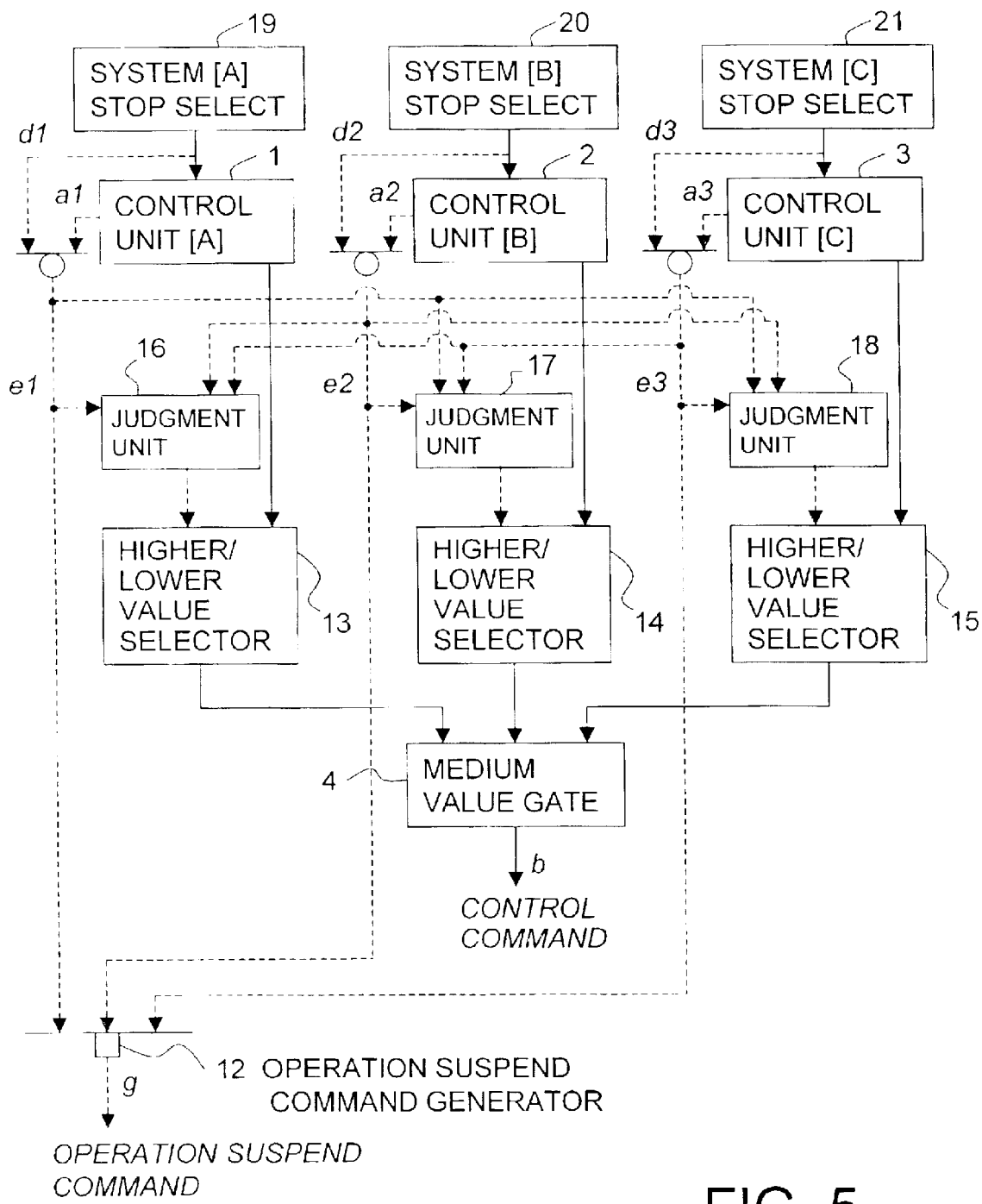
FIG. 5 is a block diagram of triple redundant control device according to a third embodiment of this invention.

FIG. 5 is a block diagram showing a third embodiment of this invention. Herein, the same reference numerals are given to the same components as the first embodiment shown in FIG. 1, and their detailed explanation is omitted. In FIG. 5, the control units 1, 2, 3 that are formed into tripled systems are constituted so that the medium value of the outputs of the three systems may be outputted as a control command b by the medium value gate (medium value selector switch) 4. Higher/lower value selector switches 13, 14, 15 are arranged between outputs of the control units 1, 2, 3 and the medium value gate 4, respectively. As for the control units 1, 2, 3, judgment units 16, 17, 18 are arranged for judging whether the higher/lower selector switches 13, 14, 15 changes signals outputted from the control units 1, 2, 3, respectively, into higher value side or lower value side.

As for the judgment unit 16 (17, 18), when a stop command d1 (d2, d3) outputted from the stop selector switch 19 (20, 21) arranged onto the control unit 1 (2, 3) is in effect, or when a failure signal e1 (e2, e3) is outputted by self-diagnostics of the control unit 1 (2, 3), a stop signal e1 (e2, e3) is in effect and inputted into the judgment unit 16 (17, 18).

Figure 6:
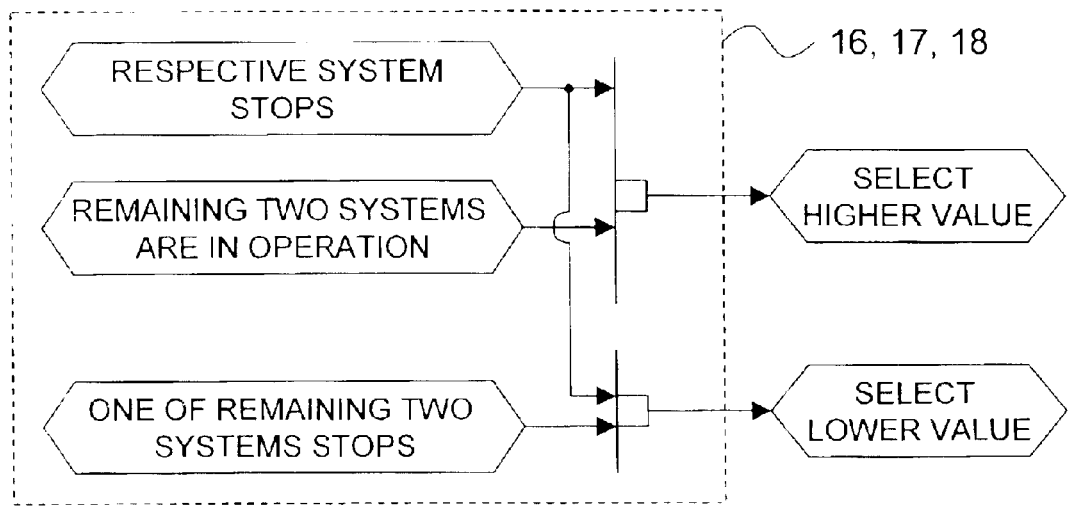
FIG. 6 is a block diagram showing an action of a judgment unit according to a third embodiment.

The function of the judgment unit 16 (17, 18) is explained with reference to FIG. 6. The judgment unit 16 (17, 18) outputs a change command to change an output from the control unit 1 (2, 3) into a higher value side when one control unit 1 (2, 3) of the respective system stops and the other control units 2, 3 ((1, 3), (1, 2)) of the other two systems are in operation. Also, the judgment unit 16 (17, 18) outputs a change command to change an output from the control unit 1 (2, 3) into a lower value side when the control unit 1 (2, 3) of the respective system stops and one of the remaining control units 2, 3 ((1, 3), (1, 2)) of the other two systems also stops, whereby only one control unit is in operation.

That is, as for the judgment unit 16 (17, 18), when the stop signal e1 (e2, e3) of the respective System A (B, C) is not inputted, the judgment unit 16 (17, 18) does not give an operation command toward corresponding higher/lower selector switch 13 (14, 15). Thus, in this case, the output from the control unit 1 (2, 3) of System A (B, C) is inputted to the medium value gate 4 without being changed. On the other hand, the judgment unit 16 outputs an operation command to the higher/lower selector switch 13 for switching a control signal into a higher value side, when a stop signal e1 of the respective System A is inputted and another stop signals e2, e3 of Systems B, C is not inputted; that is, only System A is stopped. Furthermore, the judgment unit 16 outputs an operation command to the higher/lower selector switch 13 for switching a control signal into a lower value side, when a stop signal e1 of the respective System A is inputted and either one of stop signals e2, e3 of Systems B, C is also inputted.

Similarly as for the judgment unit 17, 18, the judgment unit 17 (18) outputs a signal for switching into a higher value side when only one stop signal e2 (e3) of the control unit 2 (3) of the respective system is inputted and other systems are in operation, and the judgment unit 17 (18) outputs a signal for switching into a lower side when one stop signal e2 (e3) of the control unit 2 (3) of the respective system is inputted and either one of the other stop signals e1, e3 (e1, e2) is also inputted.

In this case, the medium value gate 4 outputs a higher value of signals outputted from two normally-operating control units as an operation command in case of one control unit being stopped, and the medium value gate 4 outputs one signal outputted from one normally-operating control unit as an operation command in case of two control units being stopped, since due to the outputs from the two control unit being stopped, one of the outputs is changed into a lower value side and the another one is changed into a higher value side. Furthermore, when three stop signals e1, e2, e3 of all three systems are in effect, the operation suspend command generator 12 outputs an operation suspend command g into controlled objects of equipment. Alternatively, by replacing a higher value side with a lower value side in the judgment units 16, 17, 18, that is, by switching into a lower value of two signals from two normally-operating control units when only one of the systems stops, the same action and effect as mentioned above can be achieved.

Figure 7:
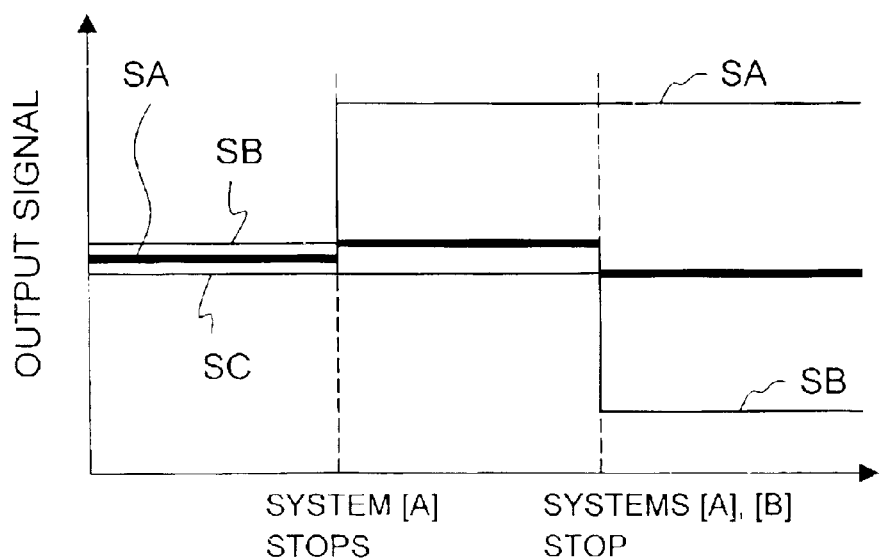
FIG. 7 is a flowchart showing an example of change signals used with the triple redundant control device shown in FIG. 5.

As an example of this embodiment, a correlation of signals outputted from three systems of control units and a command signal outputted from the signal selector 11 is explained with reference to FIG. 7. In FIG. 7, SA, SB, SC and a bold line designate the same as in FIG. 2, discussed previously.

In an initial stage where all systems are in operation, SA, which is a medium value of three signals, is chosen by the medium value gate 4. However, if one control unit of System A stops, the signal SA is changed to a higher value side, and thus the medium value gates 4 change to choose SB, which is the higher of the two remaining signals SB and SC, instead of SA. Furthermore, if the control unit of System B also stops, the signal SB is changed into a lower value side, and thus the signal selector 11 outputs a signal SC of System C instead. In this way, as a control signal, the signal selector 11 always selects a signal outputted from one system in operation.

According to this embodiment, when one of the control units is stopped for inspection or when one of control units fails, an output from this control unit is changed into a higher value side, or a lower value side, and the control is continued based on lower value selection, or higher value selection, of signals from the remaining two control units. Furthermore, if another control unit is stopped or fails, the output of this control unit is changed into a side opposite to the above-mentioned signal change and the signal selector 11 selects a signal outputted from the remaining one control unit in operation, thereby the control is continued. Furthermore, if all three control units are stopped, an operation suspend command g is outputted into controlled objects of equipment for the first time. In this way, the control of controlled equipment is maintained under a condition that at least one of the control units are in operation, and thereby, operating rates of the controlled equipment can be increased.

Fourth Embodiment

Figure 8:
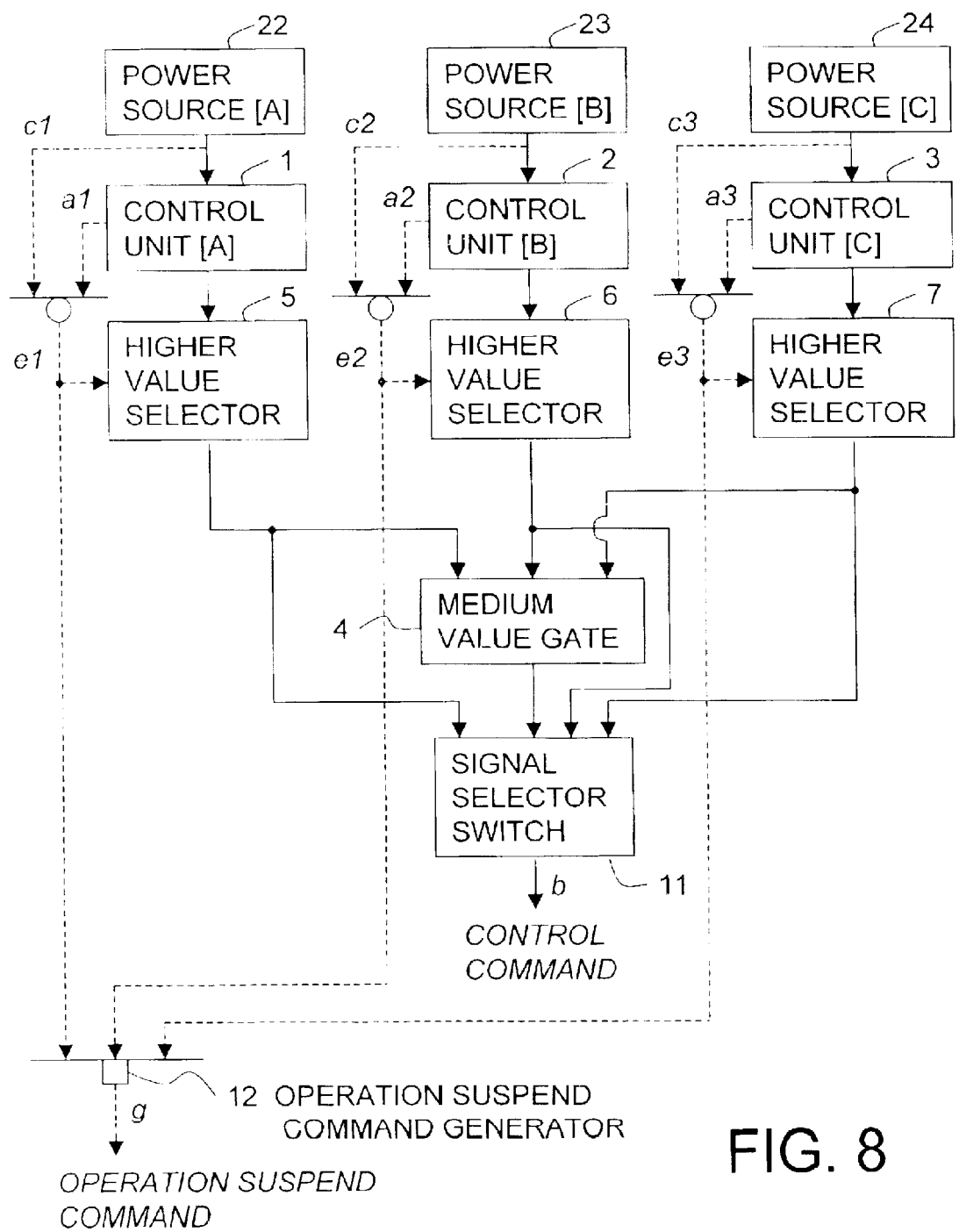
FIG. 8 is a block diagram of triple redundant control device according to a fourth embodiment of this invention.

FIG. 8 is a block diagram showing a fourth embodiment of this invention. Herein signals and functions designated with the same reference numerals as in FIG. 1 are the same as mentioned above in the first embodiment. Power sources 22, 23, 24 are respectively arranged to the control units 1, 2, 3 to supply power individually. A stop signal e1 (e2, e3) is outputted to the signal selector 11 and the operation suspend command generator 12 when the power source 22 (23, 24) outputs a power loss signal c1 (c2, c3) when a power loss of the control unit 1 (2, 3) is detected, or when the control unit 1 (2, 3) outputs a failure signal a1 (a2, a3) by self-diagnostics of the control unit 1 (2, 3). Other components are the same as the first embodiment shown in FIG. 1.

Namely, the stop signal e1 (e2, e3) is expressed as an output of OR logic (e.g., OR gate) into which the power supply loss signal c1 (c2, c3) and the failure signal a1 (a2, a3) are inputted.

According to this embodiment, when one of the power sources 22, 23, 24 is stopped for inspection, or when the power is lost by failure, or when one of failure signals a1, a2, s3 is outputted from respective one of the control units 1, 2, 3, an output from this control unit is changed into a higher value side and the control is continued based on a higher value selection of signals from the remaining two control units. Furthermore, if one another control unit is stopped or fails, the signal selector 11 selects a signal outputted from the remaining one control unit in operation, thereby the control is continued. Furthermore, if all three control units are stopped, an operation suspend command g is outputted into controlled objects of equipment for the first time. In this way, the control of controlled equipment is maintained under a condition that at least one of the control units are in operation, and thereby, operating rates of the controlled equipment can be increased.

Moreover, even if one substitutes the lower value selector switches 8, 9, 10 as shown in FIG. 3 or the higher/lower selector switches 13, 14, 15 as shown in FIG. 5, for the higher value selector switches 5, 6, 7, respectively, the same action and effect mentioned above can be achieved. Furthermore, a combination of the first embodiment or the second embodiment with the fourth embodiment is also applicable. In this case, each control unit 1 (2, 3) has a stop selector unit 19 (20, 21) and a power source 20 (21, 22), and the stop signal e1 (e2, e3) is expressed as an output from an OR logic into which the stop command d1 (d2, d3), the power loss signal c1 (c2, c3) and the failure signal a1 (a2, a3) are input. Also in this situation, the same action and effect as mentioned in the fourth embodiment can be achieved.

Fifth Embodiment

Figure 9A:
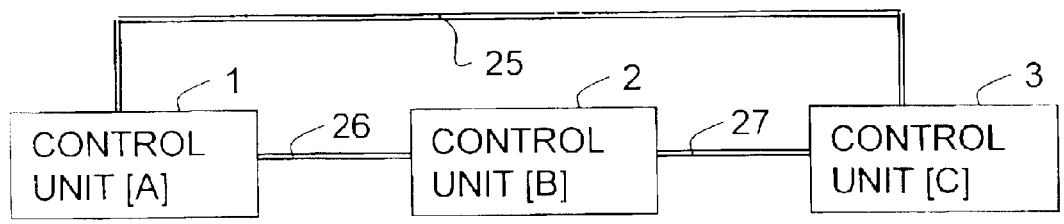
FIG. 9A is a block diagram showing an action of triple redundant control device according to a fifth embodiment of this invention.
Figure 9B:
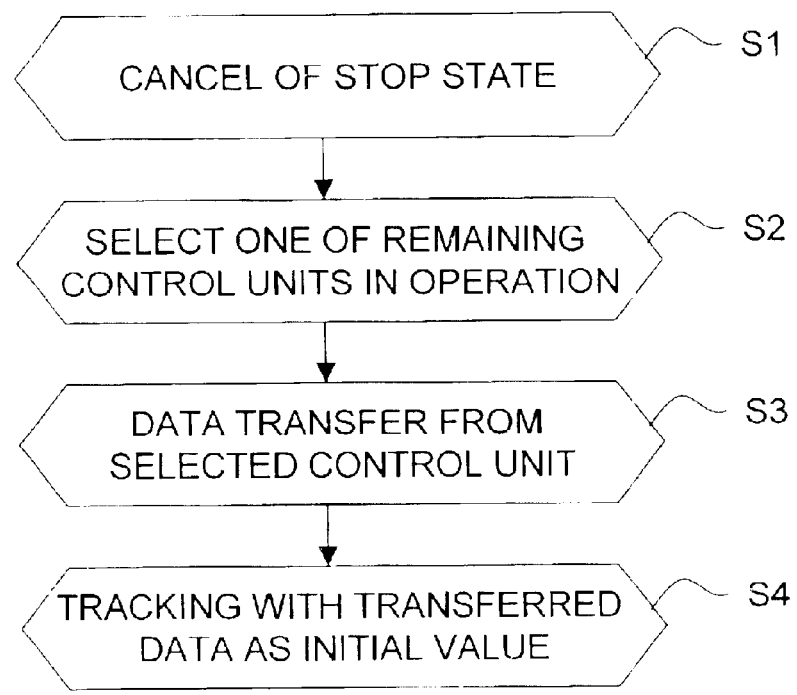
FIG. 9B is a flowchart showing an action of triple redundant control device according to a fifth embodiment of this invention.

FIGS. 9A and 9B are a block diagram and a flowchart, respectively, according to a fifth embodiment of this invention. In this embodiment, as a modification of one of the first through fourth embodiments, transmission lines 25, 26, 27 are arranged among the control units 1, 2, 3. When a stop state of one control unit is changed to an operation (e.g., normal operating state), the stop state is canceled (S1 in FIG. 9B) and one of the other control units is selected (S2). The control processing data is transferred from the selected control unit in operation into the stopped control unit via the transmission lines (S3), and thus the transferred data is used as an initial condition of the control unit having changed the states for tracking to restart the control of the control unit (S4).

According to this embodiment, in case of recovery of a stopped control unit, the control processing data of another control unit in operation is used as an initial value to restart the control processing. Thus, the recovery can be performed without giving large variance to a control command selected by and outputted from the medium value gate 4 or the signal selector 11 in restarting the stopped control unit.

Sixth Embodiment

Figure 10:
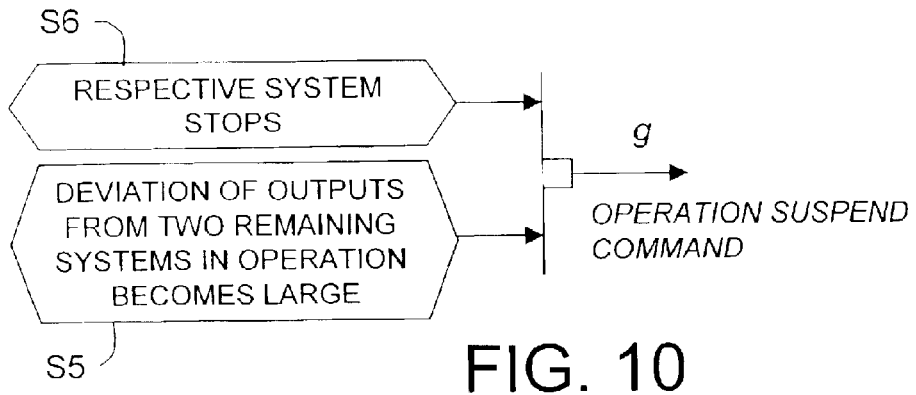
FIG. 10 is a block diagram showing an action of triple redundant control device according to a sixth embodiment of this invention.

FIG. 10 is a functional block diagram showing a sixth embodiment of this invention. In this embodiment, as a modification of one of the first through fourth embodiments, when one system of control units is in failure and other two are in operation (S5), an output deviation monitoring unit (not illustrated) is arranged such that any deviation of two outputs from the remaining two control units in operation is detected (S6), and the output deviation monitoring unit outputs an operation suspend command g to controlled objects of equipment if the detected deviation exceeds a predetermined standard value range.

According to this embodiment, when two control units are in operation and do not detect failure by self-diagnostics of the respective control units and a signal outputted from the medium value gate 4 has changed abnormally due to a defect of one control unit, the deviation monitoring unit outputs a operation suspend command to the controlled objects. Thus, the controlled objects can be stopped without negatively influencing the control.

Seventh Embodiment

Figure 11:
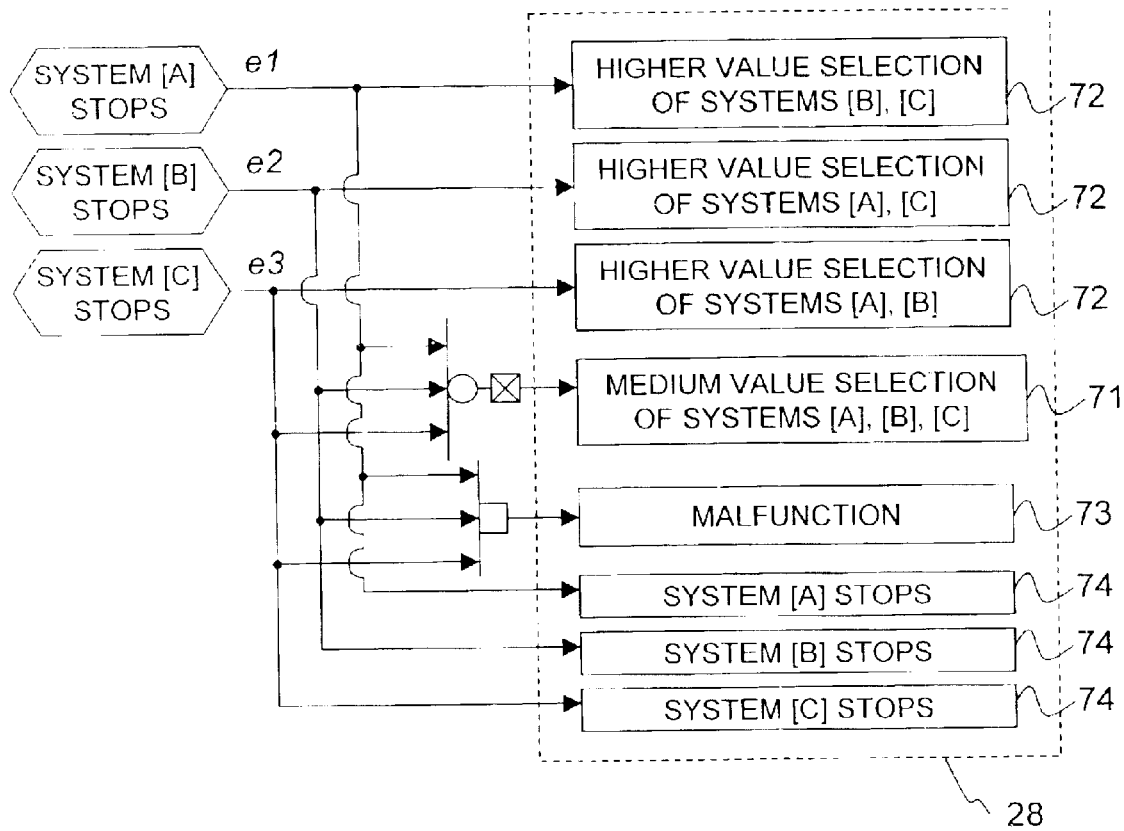
FIG. 11 is a block diagram of triple redundant control device according to a seventh embodiment of this invention.

FIG. 11 is a functional block diagram showing a seventh embodiment of this invention. In this embodiment, as a modification of one of the first through fourth embodiments, a monitoring unit 28 is arranged so as to display operation modes of three systems of the control units 1, 2, 3.

In this monitoring unit 28, when System A, System B and System C are in operation, triple and medium value selection mode 71 is designated. When one of the systems stops and the remaining two are in operation, double and higher value selection mode 72, or double and lower value selection mode, is designated. Also, when all three systems stop, major failure mode 73 is designated for suspending control of the controlled equipment. Moreover, individual operation/idle states 74 of the three control units 1, 2, 3 are also displayed. In addition, FIG. 11 shows a case where this embodiment is applied to the first embodiment and the reference label 72 serves as higher value selection mode. However, when this embodiment is applied to the second embodiment, it serves as a lower value selection mode. According to this embodiment, it becomes possible to easily supervise the state of the triple redundant control device by way of the monitor equipment 28.

Eighth Embodiment

Figure 12:
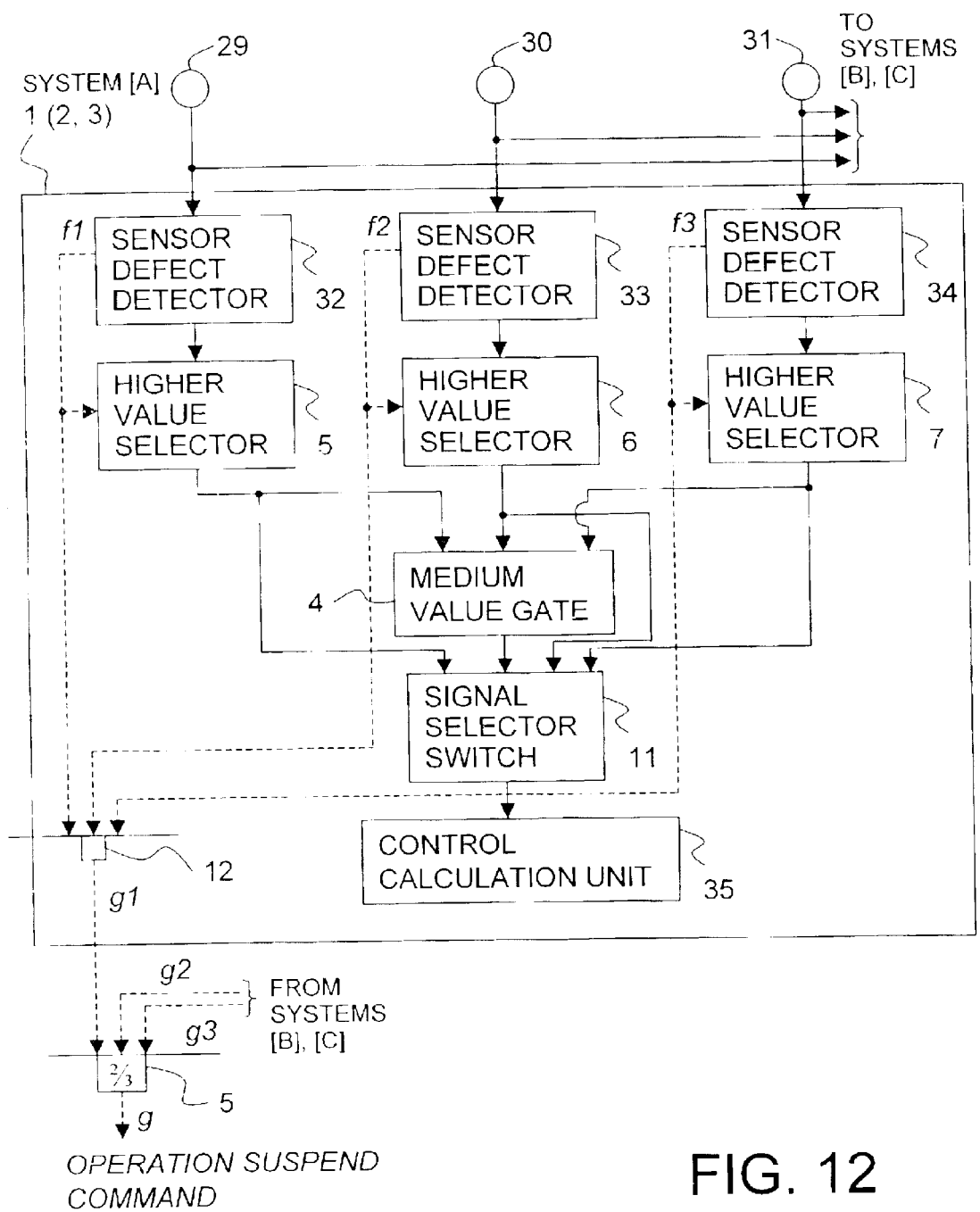
FIG. 12 is a block diagram of triple redundant control device according to an eighth embodiment of this invention.

FIG. 12 is a block diagram showing an eighth embodiment of this invention. In this embodiment, control sensors 29, 30, 31, formed into triple redundant systems, output signals, each of which is inputted to three systems of control units 1, 2, 3. In each of the control units 1, 2, 3, a medium value of the inputs from the control sensors 29, 30, 31 is selected and outputted by the medium value gate 4. In one system of a control unit 1, as for three control sensors 29, 30, 31, as Systems X, Y, Z, respectively, three sensor abnormality detectors 32, 33, 34 are arranged for detecting failure of corresponding sensors 29, 30, 31, respectively. Also, higher value selector switches 5, 6, 7 are arranged between the sensor abnormality detectors 32, 33, 34, respectively, and the medium value gate 4, and the higher value selector switch 5 (6, 7) changes an input into a higher value side when the sensor 29 (30, 31) of System X (Y, Z) is in an abnormal state and the sensor abnormality detector 32 (33, 34) outputs a sensor failure signal into the higher value selector switch 5 (6, 7).

The signal selector switch 11 normally selects a signal outputted from the medium value gate 4 and outputs the selected signal into the control calculation unit 35. When two systems of sensors are in failure, the signal selector switch 11 selects and outputs the one remaining signal outputted from the one normally-operating sensor.

According to this embodiment, when one system of control sensors is in failure, this sensor signal inputted into the control unit 1 is changed into a higher value side and thus the control is continued based on higher value selection of the two remaining sensor signals. Furthermore, if an additional one system of the remaining two sensors also fails, the remaining sensor signal in operation is selected by the signal selector 11, and the control is further continued. Moreover, when all three sensors fail, the control unit 1 firstly outputs a first operation suspend command g1 from System A control unit.

In addition, as an example of one preferable arrangement, the first operation suspend command g1 from the control unit 1 of System A is inputted into the two out of three circuit 5, together with the second and third operation suspend commands g2, g3 outputted from the control units 2, 3 of Systems B, C, respectively, and the output from the two out of three circuit 5 is arranged as an operation suspend command g. When this operation suspend command g is in effect, controlled objects of equipment are actually directed to suspend their operation, thereby, operation suspension in case of error judgment of one control unit can be avoided.

Moreover, even if the higher value selector switches 5, 6, 7 shown in FIG. 12 are transposed to lower value selector switches 8, 9, 10, respectively; the same action and effect as described in this embodiment can be achieved. Thus, operation of the controlled equipment can be continued unless all three sensors fail, thereby utilization rates of these controlled equipment can be increased.

Ninth Embodiment

Figure 13:
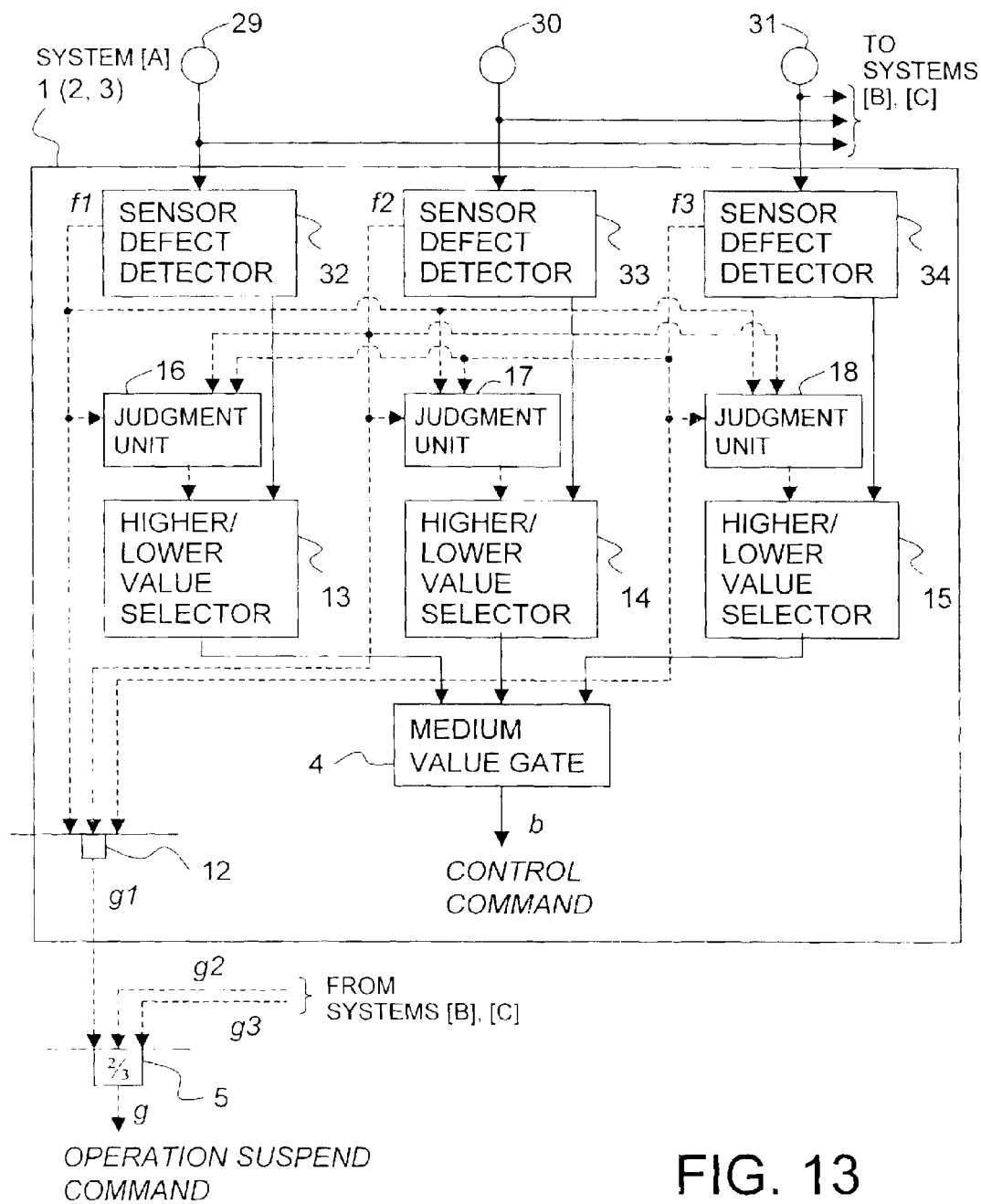
FIG. 13 is a block diagram of triple redundant control device according to a ninth embodiment of this invention.
Figure 14:
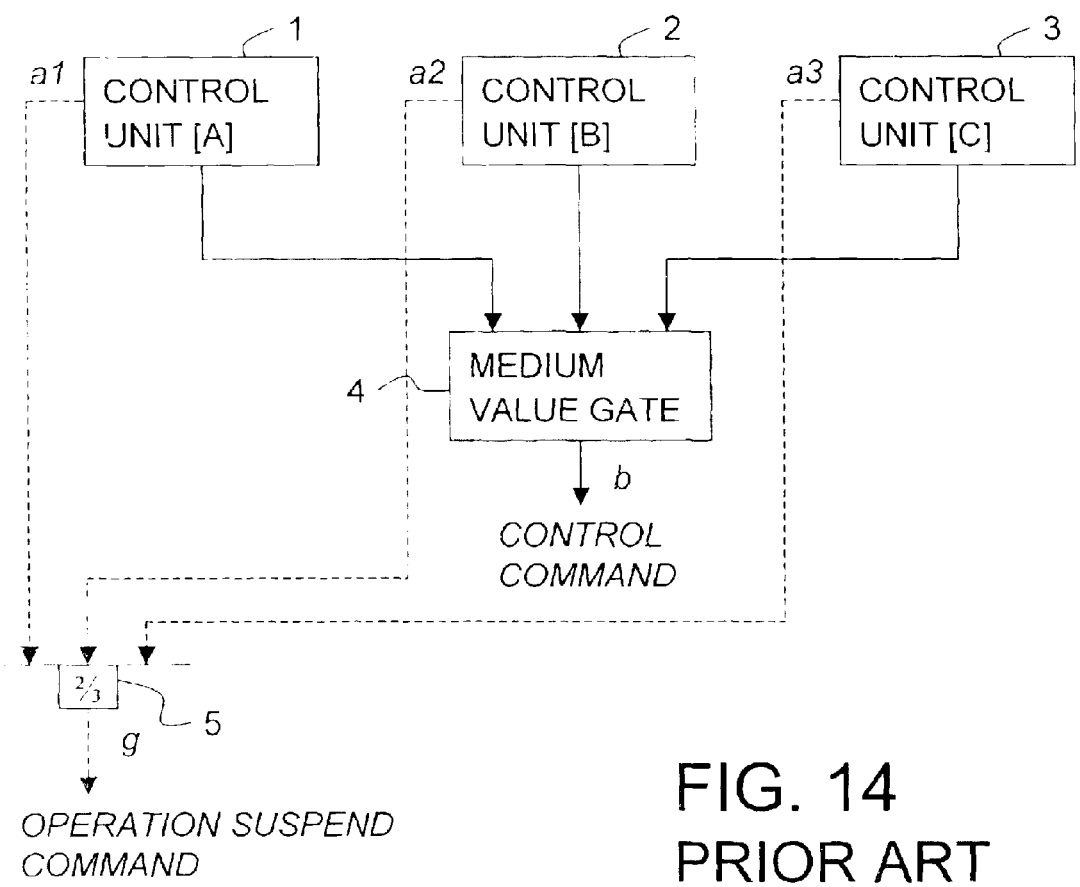
FIG. 14 is a block diagram of a conventional triple redundant control device.

FIG. 13 is a block diagram showing a ninth embodiment of this invention. In this embodiment, control sensors 29, 30, 31, formed into triple redundant systems, output signals, each of which is inputted to three systems of control units 1, 2, 3. In each of the control units 1, 2, 3, a medium value of the inputs from the control sensors 29, 30, 31 is selected and outputted by the medium value gate 4. In one system of a control unit 1, as for three control sensors 29, 30, 31, as Systems X, Y, Z, respectively, three sensor abnormality detectors 32, 33, 34 are arranged for detecting failure of corresponding sensors 29, 30, 31, respectively. Also, higher/lower value selector switches 13, 14, 15 are arranged between the sensor abnormality detectors 32, 33, 34, respectively, and the medium value gate 4, and judgment units 16, 17, 18, are arranged responsive to the respective higher/lower selector switches 13, 14, 15, for judging whether the higher/lower selector switch 13, 14, 15, respectively, changes an input from the sensors 29, 30, 31, respectively, into a higher value side, or a lower value side.

A sensor failure signal f1 (f2, f3) outputted from the sensor abnormality detector 32 (33, 34) is inputted to the judgment unit 16 (17, 18). When the judgment unit 16 (17, 18) receives only one sensor failure signal outputted from one sensor abnormality detector of the respective system, that is, when only one sensor corresponding to the judgment unit 16 (17, 18) fails and the other sensors are in operation, the judgment unit 16 outputs a command to change the respective sensor signal into a higher value side. Further, when two of the three sensors including the respective sensor are in failure, the judgment unit 16 outputs a command to change the respective sensor signal into a lower value side. In this case, firstly, when one sensor becomes inoperative or stops, the control calculation unit 35 receives a higher value of the two remaining normal sensor signals, and secondly, when an additional one sensor also becomes inoperative or stops, two outputs from the stopped two sensors are changed, that is, one of the outputs is changed into a higher value side and the other output is changed into a lower value side. Thus, the one remaining normal sensor signal is outputted from the medium value gate 4.

When three sensor failure signals f1, f2, f3 of three systems are in effect concurrently, the operation suspend command generator 12 sends an operation suspend command g to the controlled objects of equipment. It also becomes possible to change a signal into a lower value side when only one sensor is inoperative, by alternating a higher value side and a lower value side as in the function of the judgment units 16, 17, 18.

According to this embodiment, when one system of control sensors is in failure, this sensor signal inputted into the control unit 1 is changed into either a higher value side or a lower value side, and thus the control is continued based on either higher value selection or lower value selection of the two remaining sensor signals. Furthermore, when an additional one system of the remaining two sensors also fails, the sensor signal outputted from the additionally failed sensor is changed into a side opposite to a side into which the signal of firstly failed sensor changed. Thus, the medium value gate 4 selects a signal outputted from one remaining sensor that is operating normally, and the control is further continued. Moreover, when all three sensors fails, the control unit 1 firstly outputs a first operation suspend command g1 from System A control unit. Thus, operation of the controlled equipment can be continued unless all three sensors fail, thereby utilization rates of these controlled equipment can be increased.

In addition, for example as an example of one preferable arrangement, the first operation suspend command g1 from the control unit 1 of System A is inputted into the two out of three circuit 5, together with the second and third operation suspend commands g2, g3 outputted from the control units 2, 3 of Systems B, C, respectively, and the output from the two out of three circuit 36 is arranged as an operation suspend command g. When this operation suspend command g is in effect, controlled objects of equipment are actually directed to suspend their operation, thereby, operation suspension in case of error judgment of one control unit can be avoided.

According to embodiments of this invention explained above, based on medium value selection of triple redundant systems, when one system stops in operation or failure, the control is continued based on selection of the two remaining systems; when two systems stop in operation or failure, the control is further continued based on selection of one remaining operational system; and when all three systems stop, the operation suspend command is outputted for the first time for preventing malfunction of controlled objects of equipment. Therefore, a triple redundant control device and method according to this invention can raise utilization rates of the controlled objects of equipment.

What is claimed is:

1. A triple redundant control device, comprising:

first to third control units, each of which outputs a corresponding one of first to third control signals, and outputs a corresponding one of first to third control stop signals when the corresponding one of the first to third control units stops;

first to third higher value selector switches, each configured to receive the corresponding one of the first to third control signals and the corresponding one of the first to third control stop signals, which outputs the corresponding one of the first to third control signals, and changes output into a signal associated to a value higher than values of the first to third control signals when the corresponding one of first to third control stop signals is inputted;

a medium value gate configured to receive signals outputted from the first to third higher value selector switches, which selects and outputs a medium value of values corresponding to the first to third control signals; and a signal selector configured to receive the first to third control stop signals and a signal outputted from the medium value gate, which outputs the signal outputted from the medium value gate, and changes output, when two of the first to third control stop signals are inputted, into one control signal corresponding to one control stop signal not being inputted.

2. The triple redundant control device as recited in claim 1, further comprising:

an operation suspend command generator configured to receive the first to third control stop signals and a signal outputted from the signal selector, and outputs an operation suspend command to controlled objects of equipment when all of the first to third signals are inputted.

3. The triple redundant control device as recited in claim 1, further comprising:
first to third power sources, each of which provides power to the corresponding one of the first to third control units,
wherein one of the first to third power loss signals for suspending control is configured to be inputted to the operation suspend command generator when the corresponding one of the first to third power sources stops providing power.

4. The triple redundant control device as recited in claim 1, further comprising:
transmission equipment configured to transmit data among the first to third control units,
wherein, when stopped one of the first to third control units restarts to operate, the one of the first to third control units receives transmitted data from another of the first to third control units, the transmitted data being used as an initial value of control calculation of the one of the first to third control units.

5. The triple redundant control device as recited in claim 1, further comprising a deviation monitoring unit which monitors deviation of values corresponding to signals outputted from two of the first to third control units in operation when one of the first to third control units stops, and outputs a control suspend command to the controlled objects of equipment when the deviation exceeds a predetermined level.

6. The triple redundant control device as recited in claim 1, further comprising a display unit which displays operating states of the first to third control units.

7. A triple redundant control device, comprising:
first to third control units, each of which outputs a corresponding one of first to third control signals, and outputs a corresponding one of first to third control stop signals when the corresponding one of the first to third control units stops;
first to third lower value selector switches, each configured to receive the corresponding one of the first to third control signals and the corresponding one of the first to third control stop signals, which outputs the corresponding one of the first to third control signals, and changes output into a signal associated to a value lower than values of the first to third control signals when the corresponding one of first to third control stop signals is inputted;
a medium value gate configured to receive signals outputted from the first to third lower value selector switches, which selects and outputs a medium value of values corresponding to the first to third control signals; and
a signal selector configured to receive the first to third control stop signals and a signal outputted from the medium value gate, which outputs the signal outputted from the medium value gate, and changes output, when two of the first to third control stop signals are inputted, into one control signal corresponding to one control stop signal not being inputted.

8. The triple redundant control device as recited in claim 7, further comprising:
an operation suspend command generator configured to receive the first to third signals and a signal outputted from the signal selector, and outputs an operation suspend command to controlled objects of equipments when all of the first to third signals are inputted.

9. The triple redundant control device as recited in claim 7, further comprising:
first to third power sources, each of which provides power to the corresponding one of the first to third control units,
wherein one of the first to third power loss signals for suspending control is configured to be inputted to the operation suspend command generator when the corresponding one of the first to third power sources stops providing power.

10. The triple redundant control device as recited in claim 7, further comprising:
transmission equipment configured to transmit data among the first to third control units,
wherein, when stopped one of the first to third control units restarts to operate, the one of the first to third control units receives transmitted data from another of the first to third control units, the transmitted data being used as an initial value of control calculation of the one of the first to third control units.

11. The triple redundant control device as recited in claim 7, further comprising a deviation monitoring unit which monitors deviation of values corresponding to signals outputted from two of the first to third control units in operation when one of the first to third control units stops, and outputs a control suspend command to the controlled objects of equipment when the deviation exceeds a predetermined level.

12. The triple redundant control device as recited in claim 7, further comprising a display unit which displays operating states of the first to third control units.

13. A triple redundant control device, comprising:
first to third control units, each of which outputs a corresponding one of first to third control signals, and outputs a corresponding one of first to third control stop signals when the corresponding one of the first to third control units stops;
first to third judgment units, each configured to receive the first to third control stop signals, which outputs a first command to output a signal associated to a value either higher or lower than values of the first to third control signals when corresponding one of the first to third control signals is inputted and other control stop signals are not inputted, and outputs a second command to output a signal associated to a value being lower or higher, opposite to the first command, than values of the first to third control signals, when the corresponding one of the first to third control stop signals is inputted and one of other control stop signals is inputted;
first to third higher/lower value selector switches, each configured to receive the corresponding one of the first to third control signals and a command outputted from the corresponding one of the first to third judgment units, which outputs a signal in accordance with the command when the command is inputted from the corresponding one of the first to third judgment units, and outputs corresponding one of the first to third control signals when the command is not inputted;
a medium value gate configured to receive signals outputted from the first to third higher/lower value selector switches, which selects and outputs a medium value of values corresponding to the first to third control signals; and
an operation suspend command generator configured to receive the first to third signals and a signal outputted from the signal selector, and outputs an operation suspend command to controlled objects of equipment.

14. The triple redundant control device as recited in claim 13, further comprising:
first to third power sources, each of which provides power to the corresponding one of the first to third control units; and
wherein one of the first to third power loss signals for suspending control is configured to be inputted to the operation suspend command generator when corresponding one of the first to third power sources stops providing power.

15. The triple redundant control device as recited in claim 13, further comprising:
transmission equipment configured to transmit data among the first to third control units;
wherein, when stopped one of the first to third control units restarts to operate, the one of the first to third control units receives the transmitted data from another of the first to third control units, the transmitted data being used as an initial value of control calculation of the one of the first to third control units.

16. The triple redundant control device as recited in claim 13, further comprising a deviation monitoring unit which monitors deviation of values corresponding to signals outputted from two of the first to third control units in operation when one of the first to third control units stops, and outputs a control suspend command to the controlled objects of equipment when the deviation exceeds a predetermined level.

17. The triple redundant control device as recited in claim 13, further comprising a display unit which displays operating states of the first to third control units.

18. A triple redundant control device, comprising:
first to third sensors, each of which outputs a corresponding one of first to third sensor signals;
first to third sensor abnormality detectors, each of which detects state of corresponding one of the first to third sensor signals, and outputs a corresponding one of first to third sensor abnormality signals when abnormality of the corresponding one of the first to third sensor signals is detected;
first to third higher value selector switches, each configured to receive the corresponding one of the first to third sensor signals and the corresponding one of the first to third sensor abnormality signals, which outputs the corresponding one of the first to third sensor signals, and changes output into a signal associated to a value higher than values of the first to third sensor signals when the corresponding one of first to third sensor abnormality signals is inputted;
a medium value gate configured to receive signals outputted from the first to third higher value selector switches, which selects and outputs a medium value of values corresponding to the first to third sensor signals;
a signal selector configured to receive the first to third sensor signals and a signal outputted from the medium value gate, which outputs the signal outputted from the medium value gate, and changes output, when two of the first to third sensor abnormality signals are inputted, into one sensor signal corresponding to one sensor abnormality signal not being inputted; and
an operation suspend command generator configured to receive the first to third sensor abnormality signals and a signal outputted from the signal selector, and outputs an operation suspend command to controlled objects of equipment when all of the first to third signals are inputted.

19. A triple redundant control device, comprising:
first to third sensors, each of which outputs a corresponding one of first to third sensor signals;
first to third sensor abnormality detectors, each of which detects state of the corresponding one of the first to third sensor signals, and outputs a corresponding one of first to third sensor abnormality signals when abnormality of the corresponding one of the first to third sensor signals is detected;
first to third lower value selector switches, each configured to receive the corresponding one of the first to third sensor signals and the corresponding one of the first to third sensor abnormality signals, which outputs the corresponding one of the first to third sensor signals, and changes output into a signal associated to a value lower than values of the first to third sensor signals when the corresponding one of first to third sensor abnormality signals is inputted;
a medium value gate configured to receive signals outputted from the first to third lower value selector switches, which selects and outputs a medium value of values corresponding to the first to third sensor signals;
a signal selector configured to receive the first to third sensor signals and a signal outputted from the medium value gate, which outputs the signal outputted from the medium value gate, and changes output, when two of the first to third sensor abnormality signals are inputted, into one sensor signal corresponding to one sensor abnormality signal not being inputted; and
an operation suspend command generator configured to receive the first to third sensor abnormality signals and a signal outputted from the signal selector, and outputs an operation suspend command to controlled objects of equipment when all of the first to third signals are inputted.

20. A triple redundant control device, comprising:
first to third sensors, each of which outputs a corresponding one of first to third sensor signals;
first to third sensor abnormality detectors, each of which detects state of the corresponding one of the first to third sensor signals, and outputs a corresponding one of first to third sensor abnormality signals when abnormality of the corresponding one of the first to third sensor signals is detected;
first to third judgment units, each configured to receive the first to third sensor abnormality signals, which outputs a first command to output a signal associated to a value either higher or lower than values of the first to third sensor signals when corresponding one of the first to third sensor abnormality signals is inputted and other sensor abnormality signals are not inputted, and outputs a second command to output a signal associated to a value either lower or higher, opposite to the first command, than values of the first to third sensor signals when the corresponding one of the first to third sensor abnormality signals is inputted and one of other sensor abnormality signals is inputted;
first to third higher/lower value selector switches, each configured to receive the corresponding one of the first to third sensor signals and a command outputted from the corresponding one of the first to third judgment units, which outputs a signal in accordance with the command when the command is inputted from the corresponding one of the first to third judgment units, and outputs the corresponding one of a first to third sensor signals when the command is not inputted;

a medium value gate configured to receive signals outputted from the first to third higher/lower value selector switches, which selects and outputs a medium value of values corresponding to the first to third control signals; and an operation suspend command generator configured to receive the first to third signals and a signal outputted from the signal selector, and outputs an operation suspend command to controlled objects of equipments.

21. A method of controlling objects, comprising:

generating first to third control signals by first to third control units, respectively, the first to third control units corresponding to a triple redundant control system;

switching each of the first to third control signals into a signal having one of a higher value and a lower value, than values of the first to third control signals, in accordance with the corresponding one of the first to third control units being stopped;

selecting a signal having medium value of values corresponding to the first to third control signals, from the first to third control signals; and outputting the selected signal to control objects of equipment provided at least one of the first to third control units is in operation.

22. The method as recited in claim 21, further comprising:

preventing the outputting of the selected signal, and outputting an operation suspend command to the objects of equipment, provided all of the first to third control units are stopped.

* * * * *